United States Patent [19]

Goodman

[11] Patent Number: 4,577,099

[45] Date of Patent: Mar. 18, 1986

[54] APPARATUS FOR PROXIMITY DETECTION OF AN OPAQUE PATTERN ON A TRANSLUCENT SUBSTRATE

[75] Inventor: Douglas S. Goodman, Yorktown Heights, N.Y.

[73] Assignee: International Business Machines Corporation, Armonk, N.Y.

[21] Appl. No.: 626,366

[22] Filed: Jun. 29, 1984

[51] Int. Cl.⁴ .............................................. H01J 3/14
[52] U.S. Cl. .................................. 250/216; 250/550; 350/166
[58] Field of Search ................. 250/550, 216; 350/166

[56] References Cited

U.S. PATENT DOCUMENTS

| | | | |
|---|---|---|---|
| 3,278,752 | 10/1966 | Brixner | 350/166 |
| 3,761,184 | 9/1973 | McLaughlin | 350/166 |
| 4,184,749 | 1/1980 | Grossman | 350/166 |

Primary Examiner—Norman Morgenstern
Assistant Examiner—Janyce A. Bell
Attorney, Agent, or Firm—Ronald L. Drumheller

[57] ABSTRACT

The physical separation between a rear illuminated opaque pattern on a translucent substrate and an optical pattern sensing device viewing the shadow image of the opaque pattern is increased without any corresponding loss of resolution (and/or resolution may be increased without any corresponding reduction in the physical separation between the optical pattern sensing device and the opaque pattern) by positioning a narrow spectral band pass interference filter between the opaque pattern and the optical pattern sensing device, and using as the rear illumination, light having a spectrally narrow band which substantially matches the pass band of the interference filter.

9 Claims, 4 Drawing Figures

APPARATUS FOR PROXIMITY DETECTION OF AN OPAQUE PATTERN ON A TRANSLUCENT SUBSTRATE

TECHNICAL FIELD

This invention relates to apparatus for sensing or detecting an opaque pattern on a translucent background using rear illumination for the purpose of reading, recording, copying, inspecting or viewing the pattern and more particularly it relates to such apparatus wherein the pattern is sensed or detected without the use of any imaging optics.

BACKGROUND ART

Opaque patterns on translucent backgrounds are often sensed or detected for the purpose of reading, recording, copying, inspecting or viewing the pattern. This is done, for example, when documents are electronically read by an optical reading or copying device and when individual ceramic microcircuit packaging sheets are inspected prior to assembly into multilayer structures.

It is known that a pattern may be sensed or detected in theory without using any imaging optics by positioning a suitable optical pattern sensing apparatus (such as a TV camera tube, a stationary or scanned linear or matrix light detector array, a scanned individual light detector, an optically sensitive film or layer, an image converter, etc.) sufficiently close to the pattern. This is sometimes called proximity pattern detection.

Proximity pattern detection is not usually practical for use with front illumination, however, because too great a distance is required between the detector and the pattern in order to let in the front illumination. As a result, proximity pattern detection is more commonly done by forming an opaque pattern on a non-opaque background (or vice versa) and illuminating the pattern from the back (rear illumination) while positioning a suitable optical pattern sensing apparatus adjacent the front side of the pattern.

Proximity pattern detection using rear illumination works very well when the non-opaque background is transparent, because the use of collimated rear illumination then allows the optical pattern sensing apparatus to be placed a reasonable distance away from the pattern without significant loss of pattern detail or resolution.

Unfortunately, when the opaque pattern to be detected has a tranlucent background, the light scattering which occurs as the light passes through the translucent background requires that the optical pattern sensing apparatus be positioned extremely close to the pattern. This is generally not practical to do, so that projection pattern detection usually is used instead by inserting imaging optics between the opaque pattern and the optical pattern sensing apparatus. The imaging optics projects the light pattern formed by the opaque and translucent areas onto the optical pattern sensing apparatus. Because of the presence of the imaging optics, projection pattern detection is inherently much more complicated and expensive than proximity pattern detection.

The object of this invention is to provide a practical proximity pattern detection technique and apparatus wherein an opaque pattern on a translucent background may be sensed or detected using rear illumination without requiring that the optical pattern sensing apparatus be positioned unreasonably close to the pattern and without requiring any use of imaging optics between the opaque pattern and the optical pattern sensing apparatus.

DISCLOSURE OF THE INVENTION

In accordance with this invention, the physical separation between a rear illuminated opaque pattern on a translucent substrate and an optical pattern sensing device viewing the shadow image of the opaque pattern is increased without any corresponding loss of resolution (and/or resolution may be increased without any corresponding reduction in the physical separation between the optical pattern sensing device and the opaque pattern) by positioning a narrow spectral band pass interference filter between the opaque pattern and the optical pattern sensing device, and using as the rear illumination, light having a spectrally narrow band which substantially matches the pass band of the interference filter.

DESCRIPTION OF THE PREFERRED EMBODIMENTS

Figure 1:
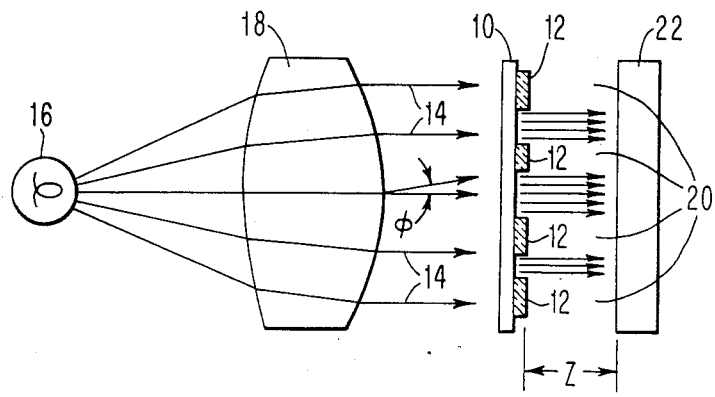
FIG. 1 shows a prior art proximity pattern detection apparatus wherein the object being detected is an opaque pattern on a transparent substrate.

In FIG. 1, a transparent substrate 10 supports an opaque pattern 12 which is illuminated from the rear with nominally parallel (collimated) illumination 14. The parallel illumination 14 may be formed, for example, by placing a source of light 16 at the front focal point of a lens 18. Since the substrate 10 is transparent, illumination 14 is not scattered very much while passing through the substrate so that a downstream optical pattern sensing device 22 will see a shadow pattern 20 corresponding to opaque pattern 12. If the pattern features of the opaque pattern 12 are large compared with the spread of light due to diffraction (approximately equal to the square root of the product of the separation Z and the wavelength of the rear illumination) and the spread of light due to divergence of the rear illumination (approximately Z times the divergence angle φ of the illumination beam), then there is a sharp shadow at the optical pattern sensing device 22 and no imaging optics are required.

Figure 2:
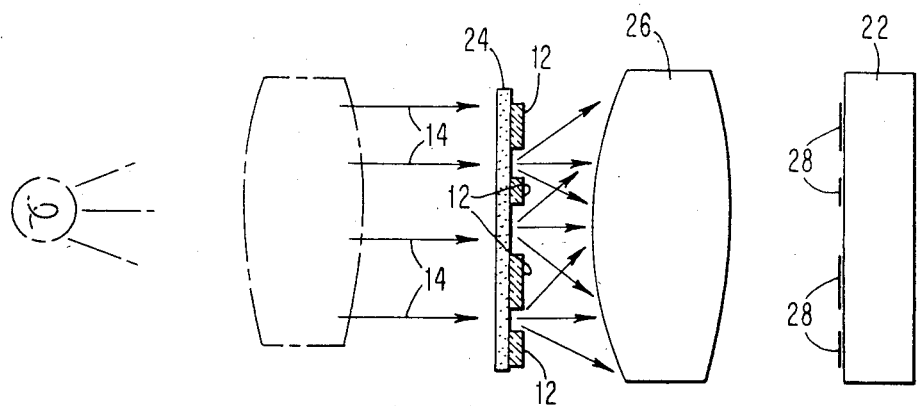
FIG. 2 is a prior art projection pattern detection apparatus wherein the object being detected is an opaque pattern on a translucent substrate.

On the other hand, if the opaque pattern 12 is carried by a translucent substrate 24, the light transmitted through the substrate is diffused or scattered at all angles, as shown in FIG. 2, and the shadow pattern of the opaque pattern 12 cannot be seen sharply by a viewing device 22 unless the viewing device is placed very close to the opaque pattern (much closer than the minimum dimensions of the pattern features in the opaque pattern 12). The optical pattern sensing device 22 may be positioned at a reasonable distance away from the pattern 12 by inserting imaging optics 26 between the opaque pattern and the optical pattern sensing device. Optics 26 acts to project an image 28 of the opaque pattern onto the input face of the optical pattern sensing device 22, as shown in FIG. 2.

Figure 3:
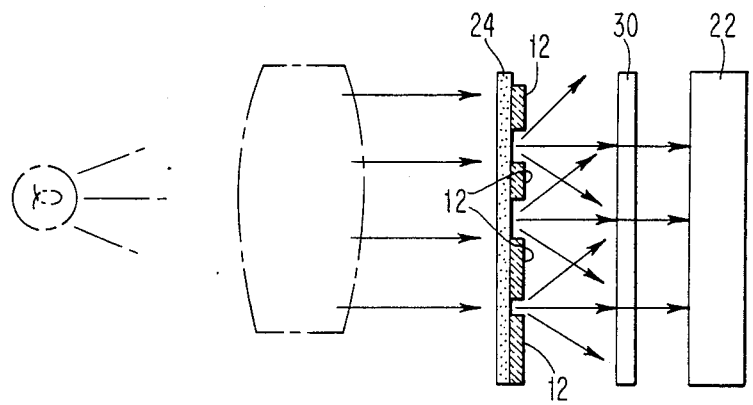
FIG. 3 illustrates a proximity pattern detection apparatus in accordance with this invention.

In accordance with this invention, FIG. 3 illustrates how the use of such imaging optics can be avoided when an opaque pattern on a translucent substrate is to be viewed by an optical pattern sensing device without positioning the optical pattern sensing device closer to the opaque pattern than the minimum feature dimensions of the pattern to be viewed. Interposed between the optical pattern sensing device 22 and the opaque pattern 12 is a narrow band pass interference filter 30, which acts as an angular filter in that it passes only the light rays which are substantially parallel to a particular direction. Interference filter 30 does not pass light rays which have been scattered in other directions by the translucent substrate. Accordingly, a shadow pattern of the opaque pattern is formed by the narrow band pass interference filter and can be seen by a downstream optical pattern sensing device 22. An interference filter of this type may be fabricated in several different ways, but the preferred way is to form a stack of thin films, all having a similar thickness. Reflections from the film interfaces causes interference effects to occur in the films such that only a narrow band of light wavelengths will be transmitted through the film stack. Interference filters of this type are described in great detail, for example, in the book entitled THIN FILM OPTICAL FILTERS by H. A. Macleod (Elsevier, 1969), which is hereby incorporated by reference.

In order for this desired effect to occur, however, it is important that the rear illumination have a narrow spectral band and that the narrow spectral band of the rear illumination and the narrow pass band of the interference filter 30 are substantially matching. "Substantially matching" is intended to mean that the spectral band of the rear illumination and the pass band of the interference filter overlap each other to a significant degree. Preferably these bands are substantially equal. However, it is possible for either band to cover a wavelength or frequency range which extends somewhat higher and/or lower than the other so long as the degree of overlap in the bands is significant. It is preferred that if one of the bands is narrower than the other, that the narrower band be the pass band of the interference filter. Preferably the pass bands are centered at substantially the same wavelength.

Figure 4:
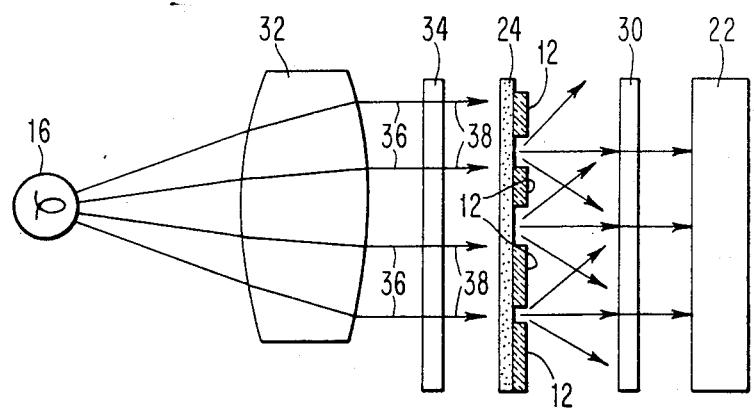
FIG. 4 shows a preferred source of rear illumination in accordance with this invention in combination with the embodiment of FIG. 3.

FIG. 4 shows how a second narrow band pass interference filter may be used to produce the narrow spectral band rear illumination from a source of light having a wider spectral band. A wide spectral band source of light 16, such as a mercury arc lamp, is first collimated by a lens 32 to produce wide band collimated light 36. The wide band collimated light is then passed through a narrow band interference filter 34. Since the light entering interference filter 34 is collimated, only a narrow band of light wavelengths will be passed. The illumination light 38 passed by the interference filter 34 also will be substantially collimated as shown. On the other side of the translucent substrate is the other narrow band interference filter 30, which must have a substantially matching narrow band pass characteristic. While the first interference filter 34 acts as a true band pass filter, the second interference filter acts as an angular filter by passing only the light rays travelling in a preferred direction determined by the band pass characteristic of the filter. The pass bands of the two interference filters must at least overlap each other to a significant degree (i.e., be "substantially matching"). Preferably, the pass bands are each centered at substantially the same wavelength and are substantially identical. However, it is possible for either band to cover a wavelength or frequency range which extends somewhat higher and/or lower than the other so long as the degree of overlap in the bands is significant. It is preferred that if one of the bands is narrower than the other, that the narrower band be the pass band of the interference filter acting as the angular filter.

It should be apparent to those of ordinary skill in this field that this invention may be used in any application where an opaque pattern on a translucent background is being read, recorded, copied, inspected or viewed for any purpose at all, and that the optical pattern sensing apparatus may take any known form. For example, the optical pattern sensing apparatus may be a TV camera tube, an image converter, a scanned light detector or linear array of light detection elements, a two dimensional array of discrete light sensing elements, an optically sensitive film or layer or surface, such as a photoresist layer or an electrophotographic surface, etc.

Having thus described my invention, what I claim as new, and desire to secure by Letters Patent is:

1. Improved proximity pattern detection apparatus of the type wherein an opaque pattern on a translucent background is rear illuminated and an optical pattern sensing device positioned in front of the opaque pattern responds to light transmitted through the translucent background without any intermediate imaging optics, the improvement wherein the rear illumination for the opaque pattern on the translucent background is narrow spectral band light and a narrow band pass interference filter is positioned between the opaque pattern and the optical pattern sensing device, the optical band passed by the interference filter and the spectral band of the rear illumination overlapping each other, whereby the maximum allowed spacing between the optical pattern sensing device and the opaque pattern is thereby increased for any desired optical resolution.

2. Improved proximity pattern detection apparatus as defined in claim 1 wherein the optical band passed by the interference filter and the spectral band of the rear illumination are substantially identical.

3. Improved proximity pattern detection apparatus as defined in claim 1 wherein the optical band passed by the interference filter and the spectral band of the rear illumination are centered at substantially the same wavelength.

4. Improved proximity pattern detection apparatus as defined in claim 3 wherein the optical band passed by the interference filter is narrower than the spectral band of the rear illumination.

5. Improved proximity pattern detection apparatus as defined in claim 1 wherein the source of narrow spectral band rear illumination comprises; a source of collimated light and a second narrow band pass interference filter for converting the collimated light to narrow spectral band collimated light.

6. Improved proximity pattern detection apparatus as defined in claim 5 wherein the two narrow band pass interference filters have overlapping pass bands.

7. Improved proximity pattern detection apparatus as defined in claim 6 wherein the two narrow band pass interference filters have substantially identical pass bands.

8. Improved proximity pattern detection apparatus as defined in claim 6 wherein the pass bands of the two interference filters are centered at substantially the same wavelength.

9. Improved proximity pattern detection apparatus as defined in claim 8 wherein the pass band of the second interference filter is wider than the pass band of the other interference filter.

* * * * *